USOO5725902A

United States Patent [19]
Lesueur-Brymer et al.

[11] Patent Number: 5,725,902
[45] Date of Patent: Mar. 10, 1998

[54] EXTRUSION PROCESS FOR MAKING A RECONSTITUTABLE REFRIED BEAN PRODUCT

[75] Inventors: Nancy Margaret Lesueur-Brymer, Calgary, Canada; Larry D. Schopf, Blue Earth, Minn.; Eugene A. Dust, Blue Earth, Minn.; Rolf E. Rogers, Blue Earth, Minn.

[73] Assignee: Alberta Wheat Pool, Alberta, Canada

[21] Appl. No.: 558,140

[22] Filed: Nov. 13, 1995

[51] Int. Cl.$^6$ .................................................. A23L 1/20
[52] U.S. Cl. .................... 426/634; 426/448; 426/506; 426/510; 426/516
[58] Field of Search .................................... 426/634, 510, 426/448, 506, 516, 629

[56] References Cited

U.S. PATENT DOCUMENTS

| | | |
|---|---|---|
| 3,489,571 | 1/1970 | Hannum . |
| 4,084,016 | 4/1978 | Kon et al. . |
| 4,124,727 | 11/1978 | Rockland et al. . |
| 4,225,630 | 9/1980 | Pitchon . |
| 4,310,558 | 1/1982 | Nanm, Jr. . |
| 4,510,164 | 4/1985 | Staley et al. . |
| 4,521,436 | 6/1985 | Lou et al. . |
| 4,735,816 | 4/1988 | Sterner et al. . |
| 4,748,037 | 5/1988 | Matsumoto et al. . |
| 5,227,190 | 7/1993 | Ward . |
| 5,296,253 | 3/1994 | Lusas et al. ............................ 426/629 |

FOREIGN PATENT DOCUMENTS

| | | |
|---|---|---|
| 948918 | 6/1974 | Canada . |
| 2158084 | 3/1996 | Canada . |

OTHER PUBLICATIONS

Database WPI Section Ch, Week 9337, Derwent Publications Ltd., London, GB, Class D13, AN 93–292981 & KR 9 209 482 B 17 Oct. 1992 (Abstract).
Uebersax et al., "Strategies and Procedures for Processing Dry Beans", Food Technology, Sep. 1991, pp. 104–111.

Primary Examiner—Anthony J. Weier
Attorney, Agent, or Firm—Banner & Witcoff, Ltd.

[57] ABSTRACT

An improved extrusion process for making a reconstitutable instant refried bean product, the process including:
  introducing a bean grind into a co-rotating twin screw extruder;
  adding sufficient water to the extruder to elevate the moisture content of the bean grind to be in the range of 25–40% by weight;
  heating the bean grind to a temperature in the range of 100° C. to 180° C.;
  extruding the cooked bean grind;
  the improvement including:
    advancing and massaging the bean grind towards an extrusion die to gelatinize the bean starch and still maintain starch granule integrity in forming a bean dough;
    selecting a die restriction such that pressure necessary to force such bean dough through the die is approximately equal to the vapor pressure of steam built up due to the product temperatures generated inside the extruder, and by virtue of die selection minimizing expansion and retrogradation of such bean dough;
    exploding such bean dough from the die as the steam and product escape.

12 Claims, No Drawings

EXTRUSION PROCESS FOR MAKING A RECONSTITUTABLE REFRIED BEAN PRODUCT

FIELD OF THE INVENTION

This invention relates to the use of extrusion technology to produce a bean product which is readily reconstitutable in water and has the stability of traditional refried bean food. More particularly the present invention is an improved process for making re-fried bean food.

BACKGROUND OF THE INVENTION

Reconstituted bean grind products have become popular in a variety of food preparations especially in the making of a re-fried bean like material, particularly for fast food chains and home use. Traditionally prepared refried bean foods are cooked for long periods under the presence of excess moisture and have smooth, thick viscosities that are stable under prolonged exposure to heat and moisture such as in steam tables at fast food restaurants or cafeterias. Although this type of traditional cooking process produces a highly desirable product the cooking time is very long and not practical for the production of large batches of refried bean food as is the case in restaurants.

Extrusion cooking has become very popular as a method to rapidly cook and extrude various types of foods including beans. In Uebersax et al. "Strategies and Procedures for Dry Beans", Food Technology, Sep. 1991, 104, there is described various general processing techniques for making bean products including that of extrusion cooking of beans to provide precooked or quick cooking bean products.

Considerable effort has been expended in developing extrusion processes for making commercial forms of bean products, as for example, exemplified in U.S. Pat. No. 4,084,016 which discloses a method of making snack foods from legume seeds. In this method legume seeds are cooked until tender, at least two hours and then formed into a slurry which is dried, preferably using a drum drier to produce a powder or flake. Flavouring agents and seasoning may be added to the powder, afterwhich the resulting paste is then extruded into thin sheets and the sheets cut into flakes and fried to obtain the final product of desired colour, texture, flavour and moisture content. U.S. Pat. No. 4,124,727 discloses a process whereby legume seeds are cooked, mashed and then mixed with methionine containing ingredients and water to form a dough. The dough is then extruded into sheets, cut into pieces and then fried to produce a snack.

U.S. Pat. No. 4,748,037 discloses a twin screw extrusion process for cooking and extruding a bean product to make a texturized snack food as a ready to eat crunchy puffed cake or modified by the addition of an aqueous solution of sugar into the material to make a red bean paste (Azucki) containing up to 30% by weight sugar. To make either product, whole or hulled beans containing less than 6 weight % lipid, 20 to 30 weight % protein and 50 to 60 weight % carbohydrate comprising a starch component is fed into a twin screw extruder. The beans are extruded through the extruder at a temperature in the range of 90° C. to 200° C. and the moisture content of the beans is adjusted to be in the range of 8 to 50 weight %. It is stated that the starch component of the bean swells while the protein component is texturized. As one skilled in the art understands, texturizing differentially denaturizes the protein component of the bean.

In Applicant's U.S. Pat. application Ser. No. 08/302,475, filed Sep. 12, 1994, extrusion technology is used to make a bean product which is reconstitutable in water as a re-fried bean food having a smooth, creamy texture. The process comprises introducing a low fat bean grind into a co-rotating twin screw extruder in which the bean grind passed through at least three distinct processing zones, before extruding of the bean product through the die. This results in an over gelatinized product containing fragmented bean starch which extrudes as a solid mass of ribbon requiring further processing into pellets or flakes. The consistency of the product is creamy, and therefore lacks a chunky mouth feel due to the high degree of rupturing of the starch sacs and gelatinization of the starch molecules. The re-fried bean product is also texturized by the three zone processing at low moisture contents which results in the protein component of the beans being denaturized allowing the product to swell more as it is being extruded. Although the product has stability with respect to extended holding times it requires additional water to be mixed into the reconstituted material in order to prevent gelling and thickening to a solid mass over time.

It is evident from the aforementioned patents and patent applications that extrusion technology, particularly twin screw extrusion technology, was used because of its short process times and product uniformity. However, extrusion technology normally provides at lower moisture contents high levels of shear to a starch based product which decreases its viscosity and causes the product to degrade faster. In normal extrusion processes, the shear of the extruder is used to develop the heat and energy input of the process. To increase this shear, lower moisture doughs are used to increase the dough viscosity in the extruder. However, this causes dextranization which is the breaking or shortening of starch molecules. In addition, traditional extrusion processes use dies and die pressure to extrude a definitive shape such as a ribbon or similar expanded or non-expanded forms which may be further processed into cereal puffs or pellets. The pressure necessary to force this material through a die must be generated by the extruder screw which in turn by generating high pressures, also develops high shear levels and additional starch disruption. The compaction of the dough both prior to and after the die and the presence of the moisture also causes the starch to retrograde upon cooling in the extruded form. This reduces the ability of the starch to hydrate and reconstitute rapidly even after grinding.

The present invention is an improved process for making an instant re-fried bean product which is readily reconstitutable in water, highly stable under extended hold times on a cafeteria steam table and has a consistency and appeal similar to that of traditional refried bean food. This improved process avoids the high shear conditions which fragments starch molecules as well as prevents the retrogradation of starch as the product is released from the extruder. The present process provides a high degree of gelatinization of the starch in the bean flour so that it reconstitutes and hydrates to a thick smooth viscosity but is able to maintain the starch granule integrity so that the starch molecules are not broken or exposed to further breakdown under extended periods of elevated temperature and moisture. This overcomes the problem of the reconstituted product gelling or thickening under holding conditions present in fast food restaurants. The process of the present invention also reduces processing time because the product is extruded as an instantized product requiring no further processing and only a short drying time.

SUMMARY OF THE INVENTION

In accordance with this invention, an improved extrusion cooking process is provided for the production of a stable and highly desirable instant refried bean product with a consistency similar to traditional re-fried beans which can be used over an extended period of time in fast food restaurants and the like.

According to an aspect of the present invention is an improved extrusion process for making a reconstitutable instant refried bean product, said process comprising:

introducing a bean grind into a co-rotating twin screw extruder;
   adding sufficient water to said extruder to elevate the moisture content of said bean grind to be in the range of 25–40% by weight;
   heating said bean grind to a temperature in the range of 100° C. to 180° C.;
   extruding the cooked bean grind;
   the improvement comprising:
      advancing and massaging said bean grind towards an extrusion die to gelatinize the bean starch and still maintain starch granule integrity in forming a bean dough;
      selecting a die restriction such that pressure necessary to force bean dough through the die is approximately equal to the vapour pressure of steam built up due to the product temperatures generated inside the extruder, and by virtue of die selection minimizing expansion and retrogradation of said bean dough;
      exploding said bean dough product from the die as the steam and product escape.

DETAILED DESCRIPTION OF THE PREFERRED EMBODIMENTS

The significant demand by fast food chains for a quickly reconstitutable re-fried bean product must be answered by a product which can be reconstituted quickly but also offers the desired consistency, flavour and optional seasoning that is expected in a normal re-fried bean material. Although some of the processing techniques of today for preparing re-fried bean product results in an acceptable product, there is a demand for an improved bean product which can be reconstituted on a fast basis for perhaps individual servings, while offering a consistency similar to traditionally prepared re-fried beans. Upon reconstitution on a bulk basis, the product must remain stable and maintain its consistency over an extended period of time such as up to one or more hours. We have found that by way of an improved extrusion process a quickly reconstitutable re-fried bean product can be prepared with an appealing controllable consistency and which meets the diverse demands in a fast food restaurant. It has also been found that in preparing the re-fried bean mixture that a corresponding household product can be prepared which is useable at home to provide equally fast rehydration times for ready use on a domestic basis. In addition, this bean product is also suitable for large scale commercial frozen food products as it can be prepared, frozen and then thawed and reheated and still maintain its original consistency.

The improved extrusion process begins with a bean ground to a granulation size which produces a product that is readily reconstituted in water while also providing for the proper consistency of the finished product. It is preferred that a mixture of fine and coarse grind of bean is used for the present process in order to produce a product having the same consistency as traditional re-fried beans which has a somewhat chunky mouth feel. However it is understood that the granulation of the bean grind can be altered depending on the desired consistency of the finished rehydrated product. The improved process has the ability to translate an irregular bean grind into the final product with the desired mouth feel when consumed. The mesh size for the ground bean based on the American Standard sieve size is material which passes a 4 mesh screen with little if any passing 120 mesh screen, although the preferred range of ground bean is material which passes a 4 mesh screen with little passing a 60 mesh screen.

A variety of beans are available which may be used in accordance with this invention. Although pinto beans are preferred and which are readily available from the Alberta Wheat Pool—Bean Plant at Bow Island, Alberta it is understood that other beans may be used to provide the same type of product, where the selection of other types of beans may vary flavour and/or texture of the end product to provide some desirable variation in the end material. In general, beans derived from the *Phaseolus vulgaris* plant variety can be used in the process of the present invention. These include kidney beans, great northern beans, small red beans, pink beans, black beans, Navy beans, Faba beans, garbanzos and the like. It is also under stood that cereals such as oats, barley, wheat and corn may be added to the bean grind to produce a more nutritious bean product having a complete amino acid profile. The process of the present invention may also incorporate the use of peas such as chick peas, green peas and lentils in order to make a reconstitutable dip or soup product.

In accordance with this process, it is understood that unlike prior processes, it is not necessary to remove the bean skin or shell, instead the entire bean or pea as supplied may be ground and readied for processing. The beans are usually supplied at the normal moisture level for stored bean product which is in the range of 8.5% to 18% by weight with a preferred moisture range of 10.0 to 14% by weight.

The supplied bean product may be ground by use of any standard type of bean grinding mill, for example the Fitzpatrick Fitzmill Model D Comminuting Machine may be used to provide the starting bean grind. The beans can be ground to 100% through various types of mesh screen sizes to provide the desired range of 4 through 120 mesh American Standard. These sizes can usually be provided by having in the comminuting machine a 0.065 inch screen where the mill is operated with flat hammers at an rpm of approximately 4,600 or with a 0.25 inch screen where the mill is operated with sharp hammers at a 4,600 rpm.

The ground bean material is fed into a co-rotating twin screw extruder through an opening in the feed end of the extrusion barrel. The grind is normally introduced to the entrance zone of the extruder where the bean grind is provided preferably on a continuous basis at a desired feed rate. A metering device such as a twin screw volumetric Model B feeder, obtained from K-Tron Corporation of New Jersey, is used to control the feed rate of the bean grind into the extruder. Continuous feed rates will be determined by: i) the size of the extruder and ii) the extent of working and cooking of the material as determined by residence time in the extruder. A preconditioner would also allow for longer residence time, however, it is understood that alterations to the feed rate would not change the present process and preconditioning, which requires an extra piece of equipment to heat the bean grind, is not preferred in the process of the present invention. Omitting the need for preconditioning makes this process faster, easier for the extruder operator to control and more economical.

A variety of extrusion/cooking extruders are available which have corotating twin screws. It has been found that extruders with other types of screw designs, that is counter-rotating twin screws, or single screws, do not provide the desired degree of working of the material to achieve a mass of the bean material before extrusion. Although many co-rotating twin screw extruders are available the preferred extruder is an APV Baker MPF-100 extruder with a 200 hp drive, a 100 mm diameter barrel and a 2500 mm long barrel. The screw elements are modular in design so that various types of elements may be used together to provide a screw profile which works best for the extrusion/cooking process of this invention.

The screw profile is selected which has the highest shear possible. Kneading elements may be used in conjunction with reverse pitch screw elements to provide increased mixing and residence time. The bean dough is put through the extruder at the highest moisture possible where the high dough temperatures can still be generated, optimally above 145° C. Since the objective is to achieve gelatinization at the highest moisture, highest temperature and highest residence time possible, a compromise of dough moisture, screw speed and feed rate are necessary with the high shear screw profile. Although a high shear screw profile is selected it is understood that the high moisture content, preferably greater than 30% by weight, acts to decrease the shear directly exerted on the bean material and therefore there is no rupturing of the starch granules. The principle aspect in selecting the screw designs is to achieve a processing sequence which improves rehydratability and helps to control the consistency of the resultant extruded bean material.

In the process of the present invention bean grind is advanced through an extrusion barrel where water, as most likely needed, is introduced. The bean grind is heated to a temperature of 100° C. to 185° C. with the optimum temperature being preferably over 140° C. Water may be introduced to ensure that the moisture content of the bean grind is in the operating range of 25 to 40 % by weight and preferably over 30 % by weight. The water added may initially be preheated to a temperature of preferably 85° C. to 95° C. in order to speed up the heating of the bean dough although preheated water up to temperatures of 180° C. may be added. This saves both time and heat flow because the hot water causes the flour to hydrate faster. The bean grind material is massaged by the high shear screw design under high water content to work the product to nearly fully gelatinize the starch in the bean flour so that it reconstitutes and hydrates to a thick smooth viscosity but also avoids shearing the starch completely to prevent starch fragmentation or dextranization. Also in the process of massaging and advancing the material to raise its temperature above 140° C., the cooking of the compressed bean grind is commenced.

It should also be noted that the high water content in the bean grind not only minimizes fragmentation of the starch molecules, but also reduces the extent to which the bean grind is converted completely into a creamy uniform texture. With the higher water content, components of the bean grind remain intact to pass onto the final product which has a chunky mouth feel when eaten.

The extrusion die opening is selected so that the pressure necessary to force the dough through the die is approximately equal to the vapour pressure of steam at the product temperatures generated inside the extruder. Therefore the high temperatures necessary for the gelatinization inside the extruder can be developed without loss of the moisture and as the product exceeds this temperature the steam pressure at the die causes the material to explode out of the die as the steam and product escape. In this manner high extrusion pressures in the worked dough are not allowed to generate inside the extruder. Once the pressure builds it is released through the die opening which blows out the bean product. This process prevents the dough from being compacted inside the extruder and retrograding into the dense plastic form when previously extruded as a defined shape. This rapid flash off of the steam in the individual flour particles also provides for additional swelling and gelatinization of the starch granule. The final product resembles a moist granular material. It is understood that the die opening may be of various configurations which allow for the product to explode out of the die.

Once blown out the die opening cooling and drying of the instantized product may be performed in a fluidize bed-type cooler where in cooling the granules the moisture content may be further reduced to the desired range of 2 to 9% by weight before packaging. The granular bean product requires a shorter drying time than ribbon or puffed extruded bean product. Drying times may vary from 5 to 30 minutes at temperatures of 90° C. to 150° C. It is appreciated that by selecting certain operating temperatures within the prescribed range, variation in resultant product characteristics can be achieved.

Although it is not preferred or required, fat may be introduced to the bean material as it is being extruded. The fat is introduced by spraying the granular bean product in an amount of about 6% to 12% by weight of the resultant product. The introduction of fat as expected favourably alters taste and mouth texture of the final bean product when eaten, but also delays the rate at which the reconstituted bean product sets up as a single indispensable mass. Although the present improved extrusion process produces a refried bean product with a good controllable consistency fat may still be added for its flavouring properties. It is also appreciated that fat can be introduced to the bean material during other processing stages such as into the bean grind. In this regard it is understood that the extruder is equipped with the necessary entrance ports to allow the introduction of fat where desired and also to allow the introduction of water into the extruder to ensure that the water content does not fall below 25% but as well does not rise above the 40% by weight upper limit.

Furthermore, it is understood that various fats may be applied to achieve this unexpected delay in setup time. The fat may be any of the well known types of vegetable oil fats, animal fats or lard and tropical oil fats. The fats are preferably in the solid state by virtue of hydrogenation, although they could be liquid, either by heating of the fat or simply standing at room temperature or by virtue of them being oils at room temperature. The fats of course, are of the well known long chain fatty acids where the length of the hydrocarbon chain varies depending on the source of the fat.

Various spices and flavourings can be added to the bean grind before, during and/or after the extrusion process. Certain flavourings may change the characteristic of the finished product when added to the bean grind before or during the extrusion process and therefore it is preferred to add flavourings to the finished extruded bean product. Flavourings may be mixed with an oil in order to easily spray onto the extruded bean product and in this manner not affect the properties of the bean product. Spices such as salt can be added directly to the bean grind before or during extrusion because they do not change the characteristic of the extruded bean product. The nature of the spices added, of course, is predetermined by the desired end product, for example, a Mexican style re-fried bean product would be spiced accordingly to achieve the standard re-fried bean Mexican taste as experienced in many authentic Mexican cuisine or Mexican style fast food restaurant chains. A natural bean product may be made in which no salt or oil is added in order to provide a healthy and lower calorie bean product. Whole or pieces of pre-cooked dehydrated beans may also be added to the granular bean product in order to provide a chunky and truly authentic re-fried bean upon rehydration with water. It is understood that pieces of other dehydrated pre-cooked vegetables may also be added to vary the taste of the final product.

The refried bean product of the present invention is highly stable and has a shelf-life storage of several years. The addition of various oils decreases the shelf life of the bean product because of the tendency of oils to go rancid after several months which is a property of the oil. For example a bean product having canola oil added has a shelf life of approximately 6 months whereas with the addition of soybean oil the bean product has a shelf life of approximately 12 months or more. The extruded refried bean product may be packaged in a manner suitable for several markets such as in small retail sizes for consumers or in mini-bulk containers suitable for food services industries. Either size of packaging has the same range of shelf life.

Although details of the apparatus have been described without reference to drawings, it is not believed necessary because the selected equipment for grinding, feeding, extruding, pelletizing and flaking the bean material, is all well known equipment which is operated in accordance with the described processing parameters of this invention to achieve a readily reconstitutable bean product having all of the advantages and features provided by the process of this invention.

The following examples are provided which are meant for illustration and do not restrict the scope of the present invention.

EXAMPLE 1

Whole pinto beans having a moisture content of 10% were ground in a FitzMill using a 1063095 screen which allows material to pass through a 4 mesh screen with little passing through a 45 mesh screen. The grind was then fed at a rate of 2160 lbs/hr to the feeding port of an APV Baker MPF-100 extruder which has a 200 hp drive, a 100 mm diameter barrel and a 2500 mm long barrel. At the same time 18.6% water, preheated to 85° C. to 95 ° C. was introduced into the extruder at the 3D position so that the moisture content of the total raw material was 25–40% by weight. The barrel temperature was set to 145° C. and forwarding and reversing paddles were set at 440 rpm's and used to work the bean grind to achieve a bean dough temperature of over 140° C. and extrusion cooking was carried out. The bean dough temperature at the die reaches over 180° C. The die opening was 8×0.190" diameter and the die pressure was 110 (PSGI). The bean material was blown out of at the die opening at a rate of 2240 lbs/hr. Drying was carried out at 150° C. for 5 minutes.

EXAMPLE 2

Whole pinto beans having a moisture content of 10% were ground in an Urschel Model N grinder using a 1061695 screen. The grind was then fed at a rate of 1080 lbs/hr to the feeding port of an APV Baker MPF-100 extruder which has a 200 hp drive, a 100 mm diameter barrel and a 2500 mm long barrel. At the same time 18.2% water, preheated to 85° C. to 95° C. was introduced into the extruder at the 3D position so that the moisture content of the total raw material was 25–40% by weight. The barrel temperature was set to 145° C. and forwarding and reversing paddles were used set at 300 rpm's to work the bean grind to achieve a bean dough temperature of over 140° C. as extrusion cooking was carried out. The bean dough temperature at the die reached over 180° C. The die opening was 4×0.190" diameter and the die pressure was 110 (PSGI). The bean material was blown out of at the die opening at a rate of 1080 lbs/hr. Drying was carried out at 150° C. for 5 minutes.

EXAMPLE 3

Whole pinto beans having a moisture content of 10% were ground in an Urschel Model N grinder using a 1062095 screen. The grind was then fed at a rate of 1080 lbs/hr to the feeding port of an APV Baker MPF-100 extruder which has a 200 hp drive, a 100 mm diameter barrel and a 2500 mm long barrel. At the same time 22.4% water, preheated to 85° C. to 95° C. was introduced into the extruder at the 3D position so that the moisture content of the total raw material was 25–40% by weight. The barrel temperature was set to 145° C. and forwarding and reversing paddles were used set at 450 rpm's to work the bean grind to achieve a bean dough temperature of over 140° C. as extrusion cooking was carried out. The bean dough temperature at the die reached over 180° C. The die opening was 4×0.190" diameter and the die pressure was 80 (PSGI). The bean material was blown out of at the die opening at a rate of 1080 lbs/hr. Drying was carried out at 150° C. for 5 minutes.

EXAMPLE 4

Whole pinto beans having a moisture content of 10% were ground in a FitzMill grinder using a 1063095 mixed screen which mixes both fine and course screenings. The grind was then fed at a rate of 2400 lbs/hr to the feeding port of an APV Baker MPF-100 extruder which has a 200 hp drive, a 100 mm diameter barrel and a 2500 mm long barrel. At the same time 18.0% water, preheated to 85° C. to 95° C. was introduced into the extruder at the 3D position so that the moisture content of the total raw material was 25–40% by weight. The barrel temperature was set to 145° C. and forwarding and reversing paddles were used set at 440 rpm's to work the bean grind to achieve a bean dough temperature of over 140° C. as extrusion cooking was carried out. The bean dough temperature at the die reached over 180° C. The die opening was 8×0.190" diameter and the die pressure was 110 (PSGI). The bean material was blown out of at the die opening at a rate of 2400 lbs/hr. Drying was carried out at 150° C. for 5 minutes.

Although preferred embodiments of the invention have been described herein in detail, it will be understood by those skilled in the art that variations may be made thereto without departing from the spirit of the invention or the scope of the appended claims.

We claim:

1. In an improved extrusion process for making a reconstitutable refried bean product, wherein said process comprises:

introducing a bean grind into a co-rotating twin screw extruder; adding sufficient water to said extruder to elevate the moisture content of said bean grind to be in the range of 25–40% by weight;

heating said bean grind to a temperature in the range of 100° C. to 185° C. to produce a cooked bean grind dough; and extruding the cooked bean grind dough;

the improvement comprising:

advancing and massaging said bean grind towards an extrusion die to gelatinize the bean starch and still maintain starch granule integrity to form a cooked bean grind dough;

providing a die restriction for extruding the cooked bean grind dough such that pressure necessary to force such cooked bean grind dough through the die is approximately equal to the vapour pressure of steam built up in the cooked bean grind dough at the temperature generated inside the extruder, whereby said cooked bean grind dough is exploded from the die by a force comprising the steam vapor pressure to form a moist granular bean product.

2. An extrusion process as claimed in claim 1, wherein said bean grind is heated within the extruder to a temperature of 145° C. to 185° C.

3. An extrusion process as claimed in claim 2, wherein said moisture content of said bean grind is 30% to 40% by weight.

4. An extrusion process as claimed in claim 3, wherein said added water is preheated to a temperature of about 85° C. to 95° C.

5. An extrusion process of claim 4, wherein said bean grind has a moisture content sufficient to reduce shear by the extruder screw.

6. An extrusion cooking process as claimed in claim 5, wherein a high sheer screw profile is selected.

7. An extrusion process as claimed in claim 6, wherein said bean grind is made from beans selected from the group consisting of kidney, pinto, great northern, reds, blacks, garbanzo, navy, faba and pinks.

8. An extrusion process as claimed in claim 7, wherein said bean grind includes ground peas selected from the group consisting of chick peas, green peas and lentils.

9. An extrusion process as claimed in claim 8, wherein said bean grind includes cereals selected from the group consisting of oats, barley, wheat and corn.

10. An extrusion process as claimed in claim 9, wherein said extruded bean product is sprayed with a fat.

11. An extrusion process as claimed in claim 10, wherein seasonings and flavourings are added to said fat to spray onto said extruded bean product.

12. An extrusion process as claimed in claim 11, wherein dehydrated whole beans are added to said extruded bean product.

* * * * *